Patented Aug. 9, 1932

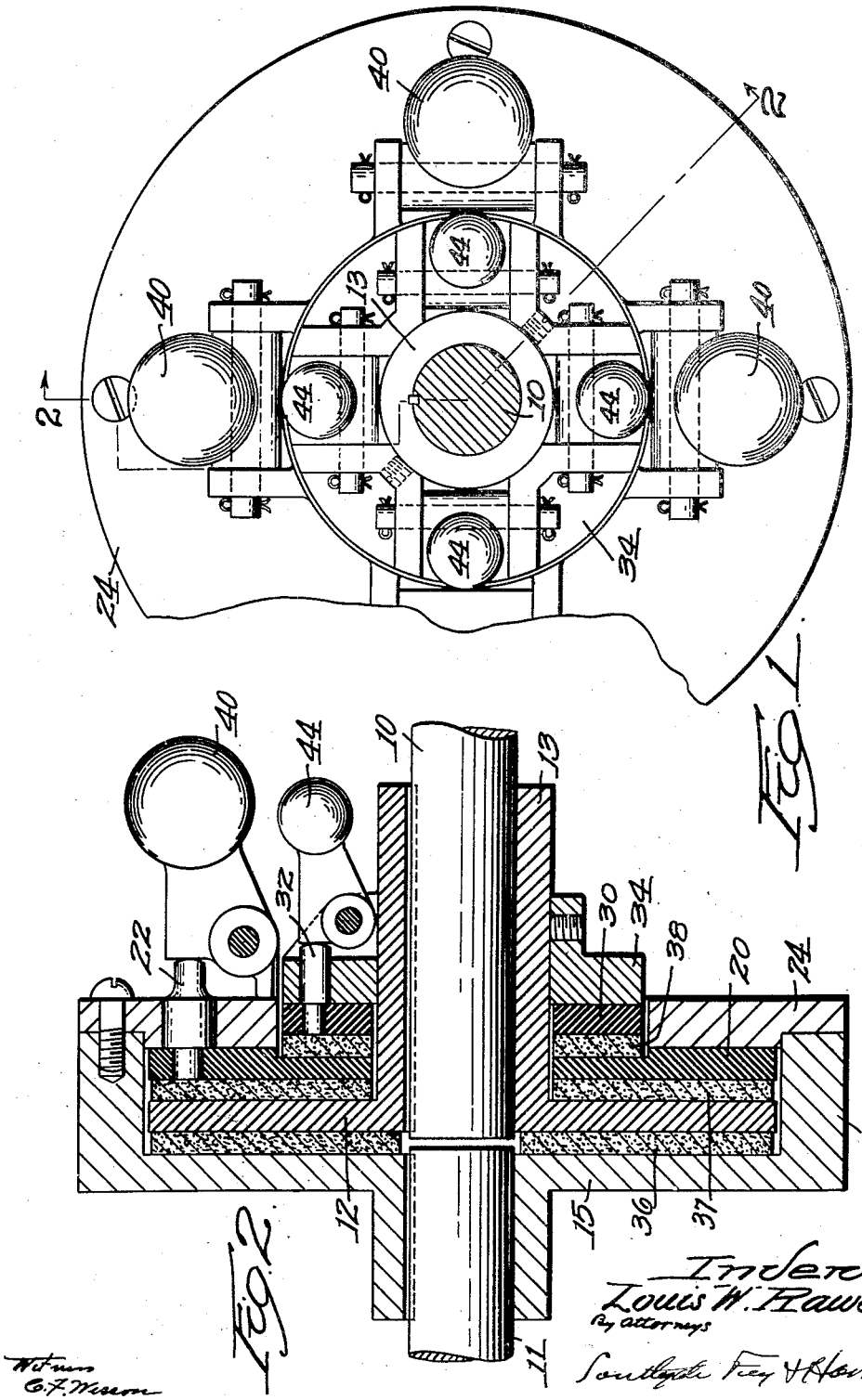

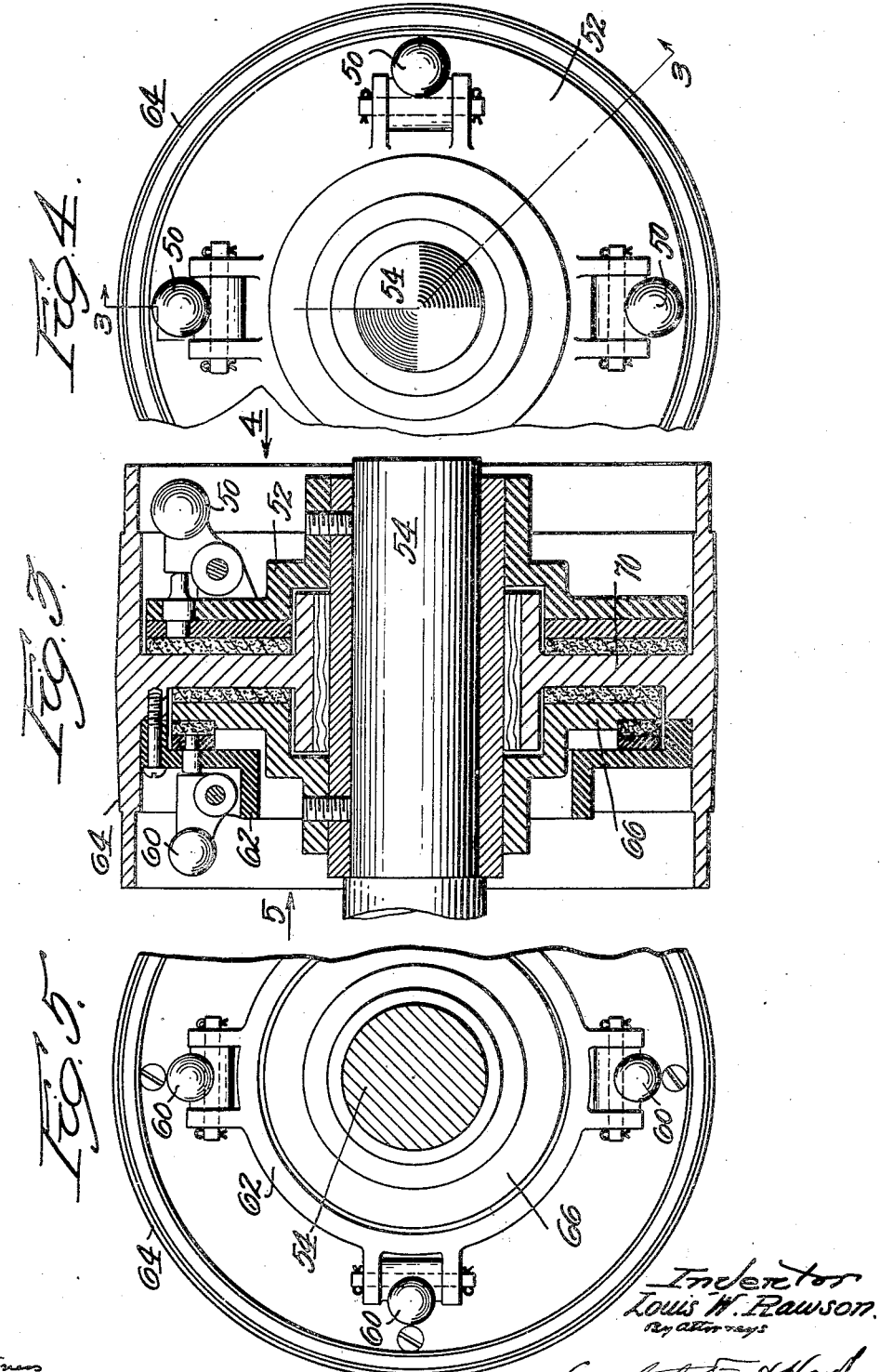

1,870,647

UNITED STATES PATENT OFFICE

LOUIS W. RAWSON, OF WORCESTER, MASSACHUSETTS, ASSIGNOR TO WORCESTER POLYTECHNIC INSTITUTE, OF WORCESTER, MASSACHUSETTS, AN EDUCATIONAL INSTITUTION OF MASSACHUSETTS

CENTRIFUGAL CLUTCH

Application filed May 31, 1929. Serial No. 367,237.

This invention relates to a clutch of the type in which centrifugal pressure applying members are provided on the driven side of the clutch.

A clutch of this general type is shown in my prior application Serial No. 275,856, filed May 7, 1928, and it is the general object of my present invention to improve the clutch therein shown, particularly by providing a more perfectly graduated application of pressure in the initial starting of the load.

To the attainment of this object, I provide a second or auxiliary set of centrifugally operated members on the driving side of the clutch, by which a predetermined initial pressure is built up.

My invention further relates to arrangements and combinations of parts which will be hereinafter described and more particularly pointed out in the appended claims.

A preferred form of the invention and a modification thereof are shown in the drawings in which Fig. 1 is a partial end elevation of a preferred form of my improved clutch;

Fig. 2 is a sectional side elevation, taken substantially along the line 2—2 in Fig. 1;

Fig. 3 is a sectional front elevation of a modified construction; and

Figs. 4 and 5 are partial side elevations, looking in the directions of the arrows 4 and 5 in Fig. 3.

Referring to Figs. 1 and 2, I have shown my improved clutch as connected between a driving or motor shaft 10 and a driven shaft 11. A driving disc 12 is provided with an elongated hub 13 keyed to the driving shaft 10 but slidable thereon. A casing 15 is fast on the driven shaft 11 and is provided with an annular flange portion 16 surrounding the disc 12.

A disc 20 is mounted within the flange 16 and is supported by studs 22 slidable axially in openings in a plate 24 mounted on the flange portion 16. An additional ring or disc 30 is mounted on the studs 32 axially slidable in openings in a member 34 which is secured to the hub 13 of the driving disc 12.

Friction discs 36, 37 and 38 of suitable material, such as leather, are interposed between the casing 15 and the disc 12, between the disc 12 and the disc 20 and between the disc 20 and the disc 30.

A plurality of centrifugal members 40 are mounted on pivots on the cover plate 24 and engage the studs 22, as clearly shown in Fig. 2. It will be noted that these members 40 are thus mounted on the driven side of the clutch.

A plurality of additional or auxiliary centrifugal members 44 are pivotally mounted on the member 34 previously described and engage the studs 32 on which the disc 30 is supported.

Having thus described the details of construction, the method of operation is as follows:

When the parts are at rest, there is no driving pressure upon the disc 12. Consequently, the motor shaft will be started under no substantial load whatever. As soon, however, as the motor shaft is started, the auxiliary centrifugal members 44 begin to apply pressure through the studs 32 to the disc 30, which pressure is transmitted to the disc 20 on the driven side of the clutch. This pressure gradually increases until it reaches a sufficient amount to cause the clutch to begin to rotate at low speed. As soon as this effect takes place, the centrifugal members 40 begin to apply increasing pressure through the studs 22, forcing the disc 20 against the driving disc 12 and the driven shaft 11 is thus gradually brought up to speed.

By this construction, the motor starts under practically no load and the full working load is picked up by gradual increments and a particularly smooth and even working clutch action is obtained.

In Figs. 3 to 5, I have shown an application of my invention to a case in which a driving pulley is loosely mounted on a shaft to be driven. The centrifugal members 50 are mounted on a plate 52 secured to the driven shaft 54 and the auxiliary centrifugal members 60 are mounted on a flange or plate 62 secured to the inside of the driving pulley 64.

As the driving pulley begins to rotate, the auxiliary members 60 apply an initial and gradually increasing pressure to the friction plate 66 carried by the driven shaft 54. This pressure eventually becomes sufficient to start the shaft in rotation, whereupon the centrifugal members 50 apply gradually increasing pressure to the web 70 of the pulley 64 and the driven shaft is thus brought gradually up to speed.

This latter construction is particularly well adapted for connecting a driving pulley to a driven shaft, as all parts of the clutch are conveniently mounted within the rim of the pulley.

In both forms of the invention, it will be noted that the centrifugal members on the driving side are of comparatively small size, so that they apply only a limited driving pressure to the clutch. This pressure is designed to be just sufficient to start the driven side of the clutch in rotation so that the main or principal centrifugal members may thereupon pick up the load.

Having thus described my invention and the advantages thereof, I do not wish to be limited to the details herein disclosed, otherwise than as set forth in the claims, but what I claim is:—

1. A centrifugal clutch, comprising a driving member, a driven member, friction elements operatively located between said members, a plurality of centrifugal clutch elements pivotally mounted to rotate with the driven member, a disc effective under influence of said centrifugal clutch elements to apply pressure to said friction elements, a plurality of auxiliary centrifugal clutch elements pivotally mounted to rotate with the driving member, and a second disc effective under influence of said auxiliary clutch members to apply pressure to said friction elements.

2. A centrifugal clutch, comprising a driving shaft and a driven shaft, a housing mounted on said driven shaft, a driving disc mounted on said driving shaft, a friction facing between said disc and said housing, a plurality of centrifugal clutch elements mounted to rotate with the driven member and effective to cause driving engagement between said disc, friction element and housing, and a plurality of auxiliary centrifugal members mounted to rotate with the driving member and effective to apply a gradually increasing preliminary friction pressure to said disc, friction element and housing.

3. A centrifugal clutch comprising a driving shaft and a driven shaft, a housing mounted on said driven shaft, a driving disc mounted on said driving shaft, a friction facing between said disc and said housing, centrifugal means connected to said driving disc and effective upon rotation of said disc to apply a gradually increasing preliminary pressure to said disc thereby to force same into driving engagement with said housing, and centrifugal means connected to said housing and effective upon rotation of said housing to apply an increased driving pressure to said disc.

4. A centrifugal clutch comprising a driving shaft, and a driven shaft, a housing mounted on said driven shaft, a driving disc mounted on said driving shaft, a friction facing between said disc and said housing, a plurality of centrifugal clutch elements pivotally mounted to rotate with the driven member and effective to cause driving engagement between said disc, friction element and housing, and a plurality of independently operable auxiliary centrifugal members pivotally mounted to rotate with the driving member and effective to apply a gradually increasing preliminary friction pressure to said disc, friction element and housing.

5. A centrifugal clutch comprising a driving shaft and a driven shaft, a housing mounted on said driven shaft, a driving disc mounted on said driving shaft, a friction facing between said disc and said housing, centrifugal means pivotally connected to said driving disc and effective upon rotation of said disc to apply a gradually increasing preliminary pressure to said disc thereby to force same into driving engagement with said housing, and independently operable centrifugal means pivotally connected to said housing and effective upon rotation of said housing to apply an increased driving pressure to said disc.

6. A centrifugal clutch comprising a driving member, a driven member, a plurality of centrifugal clutch elements pivotally mounted to rotate with the driven member, and a plurality of auxiliary centrifugal members pivotally mounted to rotate with the driving member, said elements and members being located to apply pressure to the clutch in the same direction.

7. A centrifugal clutch comprising a driving shaft and a driven shaft, a housing mounted on said driven shaft, a driving disc mounted on said driving shaft, a friction facing between said disc and said housing, centrifugal means connected to said driving disc and effective upon rotation of said disc to apply a gradually increasing preliminary pressure to said disc thereby to force same into driving engagement with said housing, and centrifugal means connected to said housing and effective upon rotation of said housing to apply an increased driving pressure to said disc, all of said centrifugal means being located on the same side of the driving disc whereby to apply pressure cumulatively in the same direction.

8. A centrifugal clutch, comprising a driving shaft and a driven shaft, a housing mounted on said driven shaft, a driving disc mounted on said driving shaft, a friction facing between said disc and said housing, a plurality of centrifugal clutch elements mounted to rotate with the driven member and effective to cause driving engagement between said disc, friction element and housing, and a plurality of auxiliary centrifugal members mounted to rotate with the driving member and effective to apply a gradually increasing preliminary friction pressure to said disc, friction element and housing, said auxiliary members being located on the same side of the driving disc as said centrifugal elements, whereby to apply pressure cumulatively in the same direction.

9. A centrifugal clutch comprising a driving housing, a driven shaft therein, a plate carried by the driven shaft, a plate carried by said housing and friction means between said plates, centrifugally acting means mounted in said housing and effective to apply a preliminary driving pressure to said plates and friction facing, and additional centrifugally acting means mounted on said shaft and effective to apply an additional driving pressure to said plates and friction facing.

In testimony whereof I have hereunto affixed my signature.

LOUIS W. RAWSON.